US012695745B2

(12) United States Patent
Bud et al.

(10) Patent No.: US 12,695,745 B2
(45) Date of Patent: **\*Jul. 28, 2026**

(54) BIOMETRIC METHODS FOR ONLINE USER AUTHENTICATION

(71) Applicant: iProov Limited, London (GB)

(72) Inventors: Andrew Bud, London (GB); Andrew Newell, West Sussex (GB)

(73) Assignee: iProov Limited, London (GB)

( \* ) Notice: Subject to any disclaimer, the term of this patent is extended or adjusted under 35 U.S.C. 154(b) by 86 days.

This patent is subject to a terminal disclaimer.

(21) Appl. No.: 19/009,943

(22) Filed: Jan. 4, 2025

(65) Prior Publication Data

US 2025/0193179 A1     Jun. 12, 2025

Related U.S. Application Data

(63) Continuation of application No. 18/244,809, filed on Sep. 11, 2023, now Pat. No. 12,192,198, which is a continuation of application No. 18/178,601, filed on Mar. 6, 2023, now Pat. No. 11,757,873, which is a continuation of application No. 17/200,857, filed on Mar. 14, 2021, now Pat. No. 11,601,423, which is a (Continued)

(51) Int. Cl.

| | |
|---|---|
| G06F 21/00 | (2013.01) |
| G06F 21/32 | (2013.01) |
| G07C 9/25 | (2020.01) |
| H04L 9/40 | (2022.01) |
| H04W 12/06 | (2021.01) |
| H04W 12/30 | (2021.01) |
| G07C 9/26 | (2020.01) |

(52) U.S. Cl.
CPC .......... *H04L 63/0861* (2013.01); *G06F 21/32* (2013.01); *G07C 9/257* (2020.01); *H04W 12/06* (2013.01); *H04W 12/30* (2021.01); *G07C 9/26* (2020.01)

(58) Field of Classification Search
CPC ... H04L 63/0861; H04L 9/3231; G06F 21/32; G07C 9/257; G07C 9/26; H04W 12/06; H04W 12/30; G06V 40/45
See application file for complete search history.

(56) References Cited

U.S. PATENT DOCUMENTS

| | | | | |
|---|---|---|---|---|
| 9,722,793 B2 * | 8/2017 | Lutian | ................ | G06V 40/1306 |
| 2021/0374399 A1 * | 12/2021 | Cheung | ................. | G06V 40/50 |
| 2023/0376581 A1 * | 11/2023 | Shear | ..................... | G06F 21/32 |

\* cited by examiner

*Primary Examiner* — William A Corum, Jr.
(74) *Attorney, Agent, or Firm* — Oliver Strimpel

(57) ABSTRACT

Methods for authenticating a genuine presence of a human involve directing one or more modulated probes towards a body part of the human, receiving a response to the probes from the body part, and analyzing the response to determine whether it contains spectral characteristics that match a class of responses to such probes for the human body part in a human population. Replay attacks are countered by varying the modulation of the probe temporally, spatially, and spectrally each time authentication is performed. The probes may include electromagnetic radiation, acoustic beams, or particle beams that generate a detected reflection, absorption pattern, scintillation, or fluorescence response of the body part. The analysis of the response may be directed to one or more of temporal, spatial, and spectral variations in accordance with the nature of the probes and the modulation.

12 Claims, 6 Drawing Sheets

Related U.S. Application Data continuation of application No. 16/231,928, filed on Dec. 24, 2018, now Pat. No. 10,951,613.

(60) Provisional application No. 62/611,459, filed on Dec. 28, 2017.

BIOMETRIC METHODS FOR ONLINE USER AUTHENTICATION

CROSS REFERENCE TO RELATED APPLICATION

This application claims priority to and the benefit of, under 35 U.S.C. § 120, and is a continuing application of U.S. application Ser. No. 18/244,809, filed Sep. 11, 2023, which is a continuation of Ser. No. 18/178,601, filed Mar. 6, 2023, now U.S. Pat. No. 11,757,873, which is a continuation of U.S. application Ser. No. 17/200,857, filed Mar. 14, 2021, now U.S. Pat. No. 11,601,423, which is a continuation of U.S. application Ser. No. 16/231,928, filed Dec. 24, 2018, now U.S. Pat. No. 10,951,613, which claims right of priority to and the benefit under 35 U.S.C. § 119 (e) of U.S. provisional patent application Ser. No. 62/611,459, filed Dec. 28, 2017.

BACKGROUND

Services of all kinds are increasingly being delivered on-line via the internet. Many of these services involve transactions which are either financial or involve personal information. If access to these services is compromised, wrongdoers may steal money or personal information from a consumer of such services, causing harm to the consumer and to the service provider. Such service providers may include banks, merchants, medical services, and government benefits agencies.

To prevent unauthorized access to these services, service providers typically require the customer to identify themselves using some sort of user name, and to corroborate this with a password.

In recent years, cyber criminals have devised ways to gain access to these credentials by such methods as eavesdropping the entry of such credentials and phishing attacks. There are also frequent large-scale security breaches in which criminals steal user credentials in bulk by breaking into corporate servers that store such information. To defend against such attacks, service providers have responded by several means, including asking the customer to enter individual characters from their passwords, perhaps using drop-down menus in order to evade key loggers, and requiring verification from a separate device known to be owned by the customer, such as a key-generating token, a mobile phone, or a password generator enabled by a chip-and-pin card. In addition, service providers are aware that passwords can easily be guessed or compromised and are demanding the use of more complex passwords.

However, consumers have a limited ability or desire to create, manage or remember a proliferation of complex passwords, and many consumers therefore use the same password for most or all of their on-line presences. The result is that if this single password—however complex—is compromised in the context of access to one service provider, the consumer's entire cyber life is open to the criminal.

The defenses described above all have the effect of creating greater complexity in the user experience, either requiring more data to remember, requiring more steps in the log-on procedure, or the possession, availability and simultaneous use of a second device. Such complexity reduces the customer's proclivity to engage in or complete transactions.

Many biometric means have been used to verify personal identity. Some of these methods require the use of special hardware to be present in the user device, which hampers widespread adoption. Other biometric authentication methods, including facial recognition methods implemented on mobile devices, have proven vulnerable to spoofing attacks using photographs or video replays. Various attempts to address this have been made by introducing "liveness" tests by making a user perform certain gestures, which reduce the user's convenience and hence user acceptance.

Physical access to premises or to enclosed volumes often require the authentication of unsupervised individuals. Whereas in the past physical items such as keys or contactless cards were required, the use of biometric verification is increasingly being used due to its convenience and its avoidance of the necessity to manage the issuance, tracking, renewal and recovery of access control items. Such biometric physical access control methods have many of the same vulnerabilities as methods to authenticate online users.

There is therefore a need for secure methods of online user authentication and access control that can be implemented on standard, widely available user devices, and that place minimal burden on the user.

SUMMARY

Biometric authentication of an online user involves analyzing responses of a user body part to one or more modulated probes impinging on a body part of the user. The analysis evaluates characteristics of the responses, including spectral, temporal, and spatial aspects. Genuineness testing includes comparing the responses to a class of responses for the body part compiled from a human population.

In general, in one aspect, a method of authenticating a genuine presence of a user includes: generating a probe of a given type that is imperceivable to human senses; modulating the probe according to a pattern, wherein the pattern is not duplicated when performing a succeeding authentication of the user using the probe; directing the modulated probe towards a body part of the user; receiving a response of the body part to the modulated probe; sending data representing the response of the body part to the modulated probe to a digital data processor; and at a digital data processor, analyzing the data representing the response of the body part and authenticating the user if the analysis indicates that: the data representing the response includes a modulation consistent with the pattern used to modulate the probe; and a quality of match between spectral characteristics of the data representing the response and spectral characteristics of a class of responses to a probe of the given type for the human body part in a human population exceeds a threshold quality of match, wherein the spectral characteristics of the data representing the response include at least one characteristic attributable to an absorption of the probe by human skin.

Various embodiments include one or more of the following features. The human population comprises a population having a specific skin type. The specific skin type is determined by analysis of the spectral properties of the data representing the response of the body part. The given type of probe comprises at least one of infra-red radiation and electromagnetic radiation having a frequency corresponding to a water vapor absorption band. The modulation includes temporal modulation of the intensity of the probe. The modulation includes temporal modulation of the frequency of the probe. The modulation includes spatial modulation of the probe. The response of the body part includes reflection of the probe. The response of the body part includes at least one of scintillation, fluorescence, phosphorescence, and persistent luminescence. The response to the incident probe includes a response from one or more artificial elements placed onto the skin of the user body part or inserted below the skin surface. The spatial arrangement of artificial elements is a significant aspect of the authentication methods, or the arrangement is not spatially significant from the point of view of authentication and genuineness testing. The user body part is one of a face, an ear, a palm, an iris, an eyelid, a hand silhouette, a fingerprint, an elbow, a foot, a retina, and a skin melanin pattern. The body part being used for the authentication may be detected automatically or may be specified by the user or by instructions to the user presented by the user device or by a device embedded in or associated with a physical access point. The probe comprises electromagnetic radiation in a first set of one or more narrow frequency bands. The response of the body part is received by a sensor capable of detecting electromagnetic radiation in a second set of one or more narrow frequency bands. At least one of the first set of frequency bands is included within the second set of frequency bands. The response of the body part is received by a sensor capable of detecting broadband electromagnetic radiation. The probe comprises broadband electromagnetic radiation. The response of the body part is received by a sensor capable of detecting electromagnetic radiation in a set of one or more narrow frequency bands and/or capable of detecting broadband electromagnetic radiation.

In general, in another aspect, a mobile device comprises a CPU and a memory storing instructions for execution by the CPU, wherein execution of the instructions on the CPU implements a method of authenticating a genuine presence of a user, the method comprising: generating a probe of a given type that is imperceivable to human senses; modulating the probe according to a pattern, wherein the pattern is not duplicated when performing a succeeding authentication of the user using the probe; directing the modulated probe towards a body part of the user; receiving a response of the body part to the modulated probe; sending data representing the response of the body part to the modulated probe to a digital data processor; and at a digital data processor, analyzing the data representing the response of the body part and authenticating the user if the analysis indicates that: the data representing the response includes a modulation consistent with the pattern used to modulate the probe; and a quality of match between spectral characteristics of the data representing the response and spectral characteristics of a class of responses to a probe of the given type for the human body part in a human population exceeds a threshold quality of match, wherein the spectral characteristics of the data representing the response include at least one characteristic attributable to an absorption of the probe by human skin.

In general, in a further aspect, an application for a mobile device comprises instructions for execution on a CPU of a mobile device, the instructions being stored on a non-transitory computer-readable storage, wherein the instructions, when processed on the CPU of the mobile device, instruct the mobile device to perform a method of authenticating a genuine presence of a user, the method comprising: generating a probe of a given type that is imperceivable to human senses; modulating the probe according to a pattern, wherein the pattern is not duplicated when performing a succeeding authentication of the user using the probe; directing the modulated probe towards a body part of the user; receiving a response of the body part to the modulated probe; sending data representing the response of the body part to the modulated probe to a digital data processor; and at a digital data processor, analyzing the data representing the response of the body part and authenticating the user if the analysis indicates that: the data representing the response includes a modulation consistent with the pattern used to modulate the probe; and a quality of match between spectral characteristics of the data representing the response and spectral characteristics of a class of responses to a probe of the given type for the human body part in a human population exceeds a threshold quality of match, wherein the spectral characteristics of the data representing the response include at least one characteristic attributable to an absorption of the probe by human skin.

In general, in another aspect, a method of controlling a physical access of a user comprises: generating on a user device a first probe of a first type; modulating the probe according to a first pattern wherein the first pattern is not duplicated when performing a succeeding authentication of the user using the first probe; directing the modulated first probe towards a body part of the user; illuminating the body part with a second probe of a second type, wherein the second probe is physically associated with a physical space in which the user is located when the modulated first probe is directed towards the body part of the user; modulating the second probe according to a second pattern wherein the second pattern is not duplicated when performing a succeeding authentication of the user using the second probe; receiving a response of the body part of the user to the modulated first probe and the modulated second probe; sending data representing the response of the body part to the modulated first probe and the modulated second probe to a digital data processor; at the digital data processor, receiving the data representing the response of the body part, analyzing the received data; and allowing the user to gain physical access if the analysis indicates that: the received data includes a modulation consistent with the first pattern and the second pattern; and a quality of match between spectral characteristics of the received data and spectral characteristics of a class of responses of the body part in a human population to a probe of the first type and to a probe of the second type exceeds a predetermined threshold quality of match.

Various embodiments include one or more of the following features. At least one of the first probe and the second probe is imperceivable to human senses and optionally includes at least one of infra-red radiation and electromagnetic radiation having a frequency corresponding to a water vapor absorption band. The user device is a smartphone. The modulation of at least one of the probes includes one or more of temporal modulation of the intensity of the probe, temporal modulation of the frequency of the probe, and spatial modulation of the probe. The response of the body part includes reflection of the probe. The response of the body part includes features attributable to absorption of one or more probes by the body part. The response of the body part includes at least one of scintillation, fluorescence, phosphorescence, and persistent luminescence. The response to the incident probe includes a response from one or more artificial elements placed onto the skin of the user body part or inserted below the skin surface. The spatial arrangement of artificial elements is a significant aspect of the authentication methods, or the arrangement is not spatially significant from the point of view of authentication and genuineness testing. The user body part is one of a face, an ear, a palm, an iris, an eyelid, a hand silhouette, a fingerprint, an elbow, a foot, a retina, and a skin melanin pattern. The body part being used for the authentication may be detected automatically or may be specified by the user or by instructions to the user presented by the user device or by a device embedded in or associated with a physical access point. At least one of the probes comprise electromagnetic radiation in a first set of one or more narrow frequency bands. The response of the body part is received by a sensor capable of detecting electromagnetic radiation in a second set of one or more narrow frequency bands. At least one of the first set of frequency bands is included within the second set of frequency bands. The response of the body part is received by a sensor capable of detecting broadband electromagnetic radiation. At least one of the probes comprises broadband electromagnetic radiation. The response of the body part is received by a sensor capable of detecting electromagnetic radiation in a set of one or more narrow frequency bands and/or capable of detecting broadband electromagnetic radiation.

DETAILED DESCRIPTION

Figure 1:
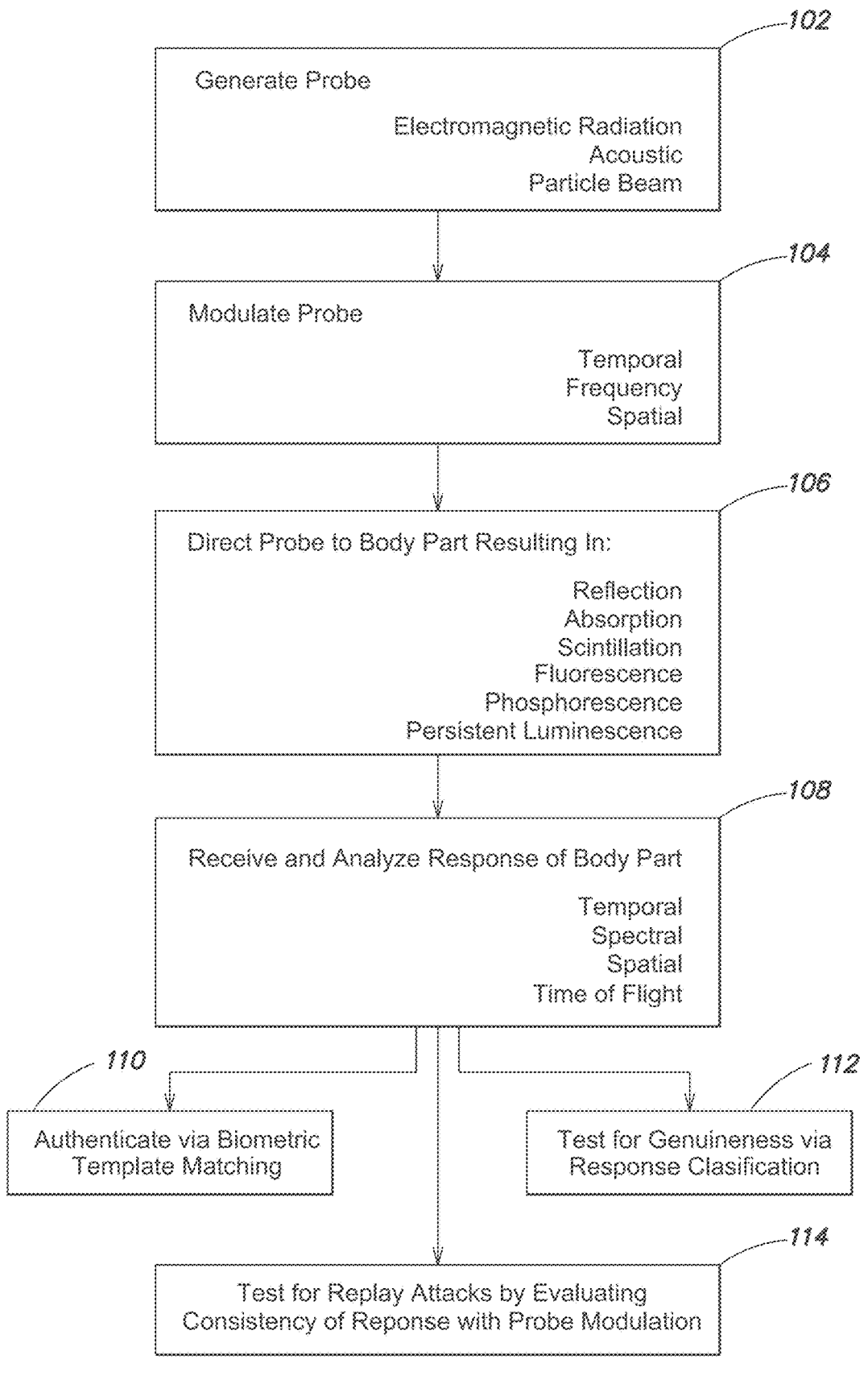
FIG. 1 is a high-level block diagram illustrating steps involved in the described methods for online user authentication.

Biometric authentication methods depend for their effectiveness on the combination of two tests: reference template matching and genuineness. Reference template matching tests whether the presented biometric credential resembles the biometric (e.g., face/iris/fingerprint) that is stored as the reference template of the individual. This is a secure test if the credential is a secret, since the test depends on the user presenting this secret, in a similar way to the presentation of a password. However, in the case of many biometrics, secrecy cannot be guaranteed or even assumed, and in the case of the face, the biometric must be considered public, due to the likelihood of images being published on the internet. In such cases, the genuineness test is far more important. It tests whether the credential that is being presented is indeed the unique genuine article whose possession can only ever be an attribute of the rightful owner, or whether it is a forgery which could be in the possession of someone else. The authentication relies on there being only one instance of the genuine article. In the case of a face, the genuine article is immovably attached to the front of the skull of the user, and there is no other. For this reason, the security of a biometric credential test largely rests on the test for genuineness.

The genuineness of a credential may be compromised either as a whole object or only in certain parts. For example, an entire biometric credential may have been forged as part of an attempt to gain access to a user's account. Alternatively, a genuine biometric may be altered in some way to allow for the creation of multiple biometric signatures from a single user. For example, artificial substances may be applied to certain regions of the face to change the biometric signature.

In the case of biometrics which can be captured visually, including faces, irises, ears, eyelids, palms, hand silhouette, fingerprints, elbows, feet, retinas, and skin melanin patterns, the problem is how to distinguish an image of the genuine article from an image of a forgery, or a forged image of the real article, both of which may pass the reference template matching test.

Various methods of genuineness testing involve analysis of the characteristics of the image including its texture, its video coding, its image data structure and/or its meta-data. Behavioral methods include the detection of involuntary movements, the detection of stimulated involuntary movement and the detection of stimulated voluntary movement, all such movements being either of the selected biometric, or of the device capturing the biometric, or of a combination of both. Examples of involuntary movement of the device may include movements caused by heartbeat, neuromuscular stimulation, and tremor. Examples of stimulated movement of the device include device movements in response to movement of imagery (including face imagery) on the device screen, vibration of the device, and sounds emitted by the device. Such methods are subject to attack by means of synthetic video, which may be capable of generating imagery of the user which exhibits the necessary movement in real time.

A further approach involves the observation of electromagnetic or acoustic waves emitted by the subject and their comparison with what would be expected to be emitted by a genuine human body part. For example, the periodic pulsing of blood arising from the heartbeat is observable at the skin both in the visible spectrum and in the infra-red. The changes are at such a low level that normally they are difficult to detect amongst the high levels of noise due to ambient illumination levels. However, signal to noise ratios may be significantly improved by making tightly band-limited observations in spectral bands in which ambient illumination is low, such as in the atmospheric water absorption bands in the near infra-red (for example at a wavelength of 1380 nm).

A further approach involves the use of ambient illumination by electromagnetic radiation or sound. The ambient illumination is not under the direct control of the biometric tester and may include daylight, artificial indoor light, illumination from surveillance cameras, ambient noise, or blackbody radiation from other people or objects in the vicinity. The response of the body part to such ambient illumination is analyzed for its absorption and reflection characteristics. These characteristics may include spectral absorption, and specular and diffuse scattering. Such ambient illumination may be considered as probes supplied by the environment.

A further approach involves the use of controlled illumination to discover other characteristics of the body part used as a credential. Controlled illumination is illumination created specifically to assist in the biometric authentication process and is directed at the subject. In the case of irises, the use of controlled infra-red light is necessary in order to reveal the structure of the iris so as to permit its comparison with the template. However, as a test of genuineness it has shown vulnerability to attacks involving photographic reproductions. Controlled illumination can also be used to provide information about the shape of the body part that would not otherwise be available, helping to defend against screen-based attacks which are necessarily 2D in structure.

Controlled illumination can also be changed dynamically and in a unique manner during the course of the capture, so as to distinguish the current authentication attempt from any other in the past or future, thereby preventing the successful use of recorded imagery.

The development of 3D printing has made it possible to create extremely high-quality 3D copies of human biometrics. The source of such copies is a 3D digital model, which can be developed on the basis of an arbitrary creative design of an artist, or on one or more images of the body part, which may have been published by the owner or stolen in a physical or digital manner. Such a digital model can be used to create realistic synthetic imagery of the user, or to print a physical copy of a user. In this manner, an attacker may be able to enroll a fake, replicate it, and use it freely to authenticate a fraudulent account without ever making any of the attacker's own biometrics visible. Physical copies may comprise masks made of a hard material, or of a soft material which can be applied to the body part of another person seeking to impersonate the depicted person. The masks may be made of materials such as silicone whose reflectivity characteristics resemble those of human skin in their balance between specular and diffuse reflection, and in the spectral makeup of such reflections. Hair and other features may be attached to such masks to make them look more real.

It is also possible to coat the rear surface of such masks with conductive materials such as thick film nickel which become warm when electric current is passed through it. This can be used to warm the mask to the temperature of human skin, to warm different parts of the mask to a different degree, and to do so in a time-varying fashion. Taken together, these measures can serve to create a thermal signature of the mask that resembles in its broadband intensity, if not in its spectral characteristics, that of a live human face in an attempt to combat means of genuineness detection that rely on broadband measures of the intensity of infra-red emissions from the body part.

It is also possible to create display devices that display realistic images of the body part when viewed without spectral discrimination in the infrared part of the spectrum. If a means were to be found to photograph or capture a video of the infra-red emissions or reflections from a body part, it could be reproduced on a screen capable of displaying images in the infra-red, as well or instead of in the visible spectrum.

Infra-red imaging has been used for the purposes of biometric matching, especially for face recognition and verification. In this approach, infra-red images of the body part are captured and compared with templates captured in the infra-red during enrollment. The principal reason for using infra-red is that the resultant imagery is much less influenced by ambient lighting conditions thanks to its better signal-to-noise ratio. Since biometric matching methods that are sensitive to differences in ambient lighting may be subject to false results caused by ambient lighting conditions, the use of biometric images taken in the infra-red can improve the performance of such matching. Such use of infra-red for imaging body parts in order to enhance the signal to noise ratio of the image for reference template matching is distinct and different from the use of infra-red imagery to determine the genuineness of the observed body part.

We describe herein methods of biometric authentication that use a probe directed towards a human body part to cause a response of the body part that is used to perform both reference template matching and genuineness testing. The probe is modulated as a defense against replay attacks. FIG. 1 illustrates the principal steps involved, and includes, for each step, various alternative ways of implementing the steps, some of which may be used in combination. As used herein, online user authentication is used to refer to one or more collectively of genuineness testing, liveness testing, and verification of an identity presented by an online user. The method starts with generating the probe (102) in the form of electromagnetic radiation, an acoustic beam, or a particle beam. The probe is modulated (104) using one or more of amplitude, frequency, or spatial modulation. The probe is directed towards the human body part, and when it is incident upon the part, the result may be one or more of reflection and absorption of the probe, and scintillation, fluorescence, phosphorescence, and persistent luminescence (106). One or more of the probe reflection and scintillation, fluorescence, phosphorescence, and persistent luminescence are received from the body part in response to the probe and the response is analyzed (108). The analysis of the response is directed to one or more of reflection gain, temporal behavior, spectral characteristics, spatial variation, and time-of-flight. The results of the analysis are available for biometric template matching (110), genuineness testing via classification of the response (112), and testing for replay attacks via evaluation of the consistency of the received response from the body part with the modulation imposed on the probe. Each of the steps and their variants are discussed below.

Figure 2:
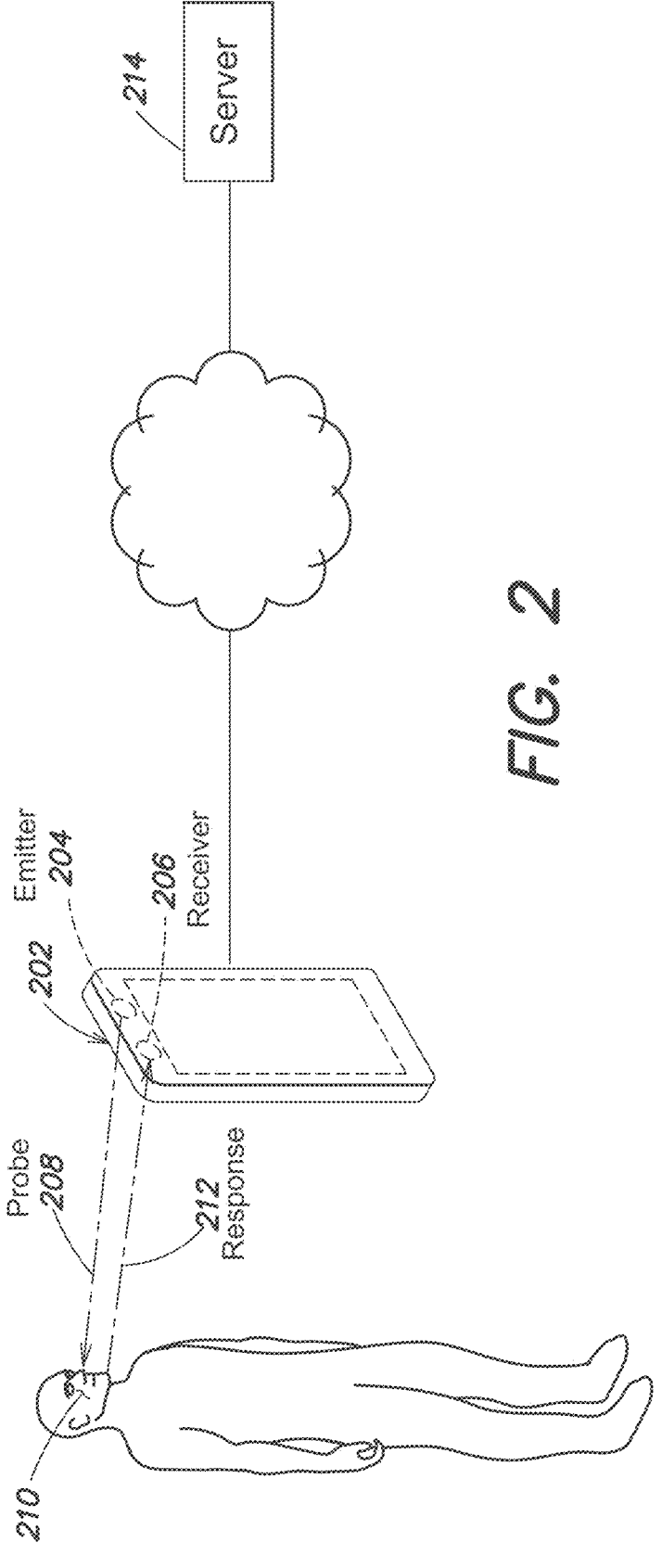
FIG. 2 is a diagram illustrating an embodiment of the described authentication methods based on a user device.

FIG. 2 is a high-level illustration of an implementation of the biometric authentication methods described using a mobile device. User device 202, which may be a smartphone, or a tablet includes emitter 204 and receiver 206. The emitter is used to generate probe 208 that is directed towards human body part 210. Response 212 of the body part is received at receiver 206, which includes a sensor that is sensitive to the type of body part response caused by incidence of the probe on the body part. The mobile device in data communication with server 214, where some or all of the analysis of the received response is performed. In various embodiments, the connection to a server is absent, and the processing is performed on the mobile device itself, or on another system local to the device. In many use cases, mobile device 202 is a smartphone belonging to a user who is being authenticated.

Figure 3:
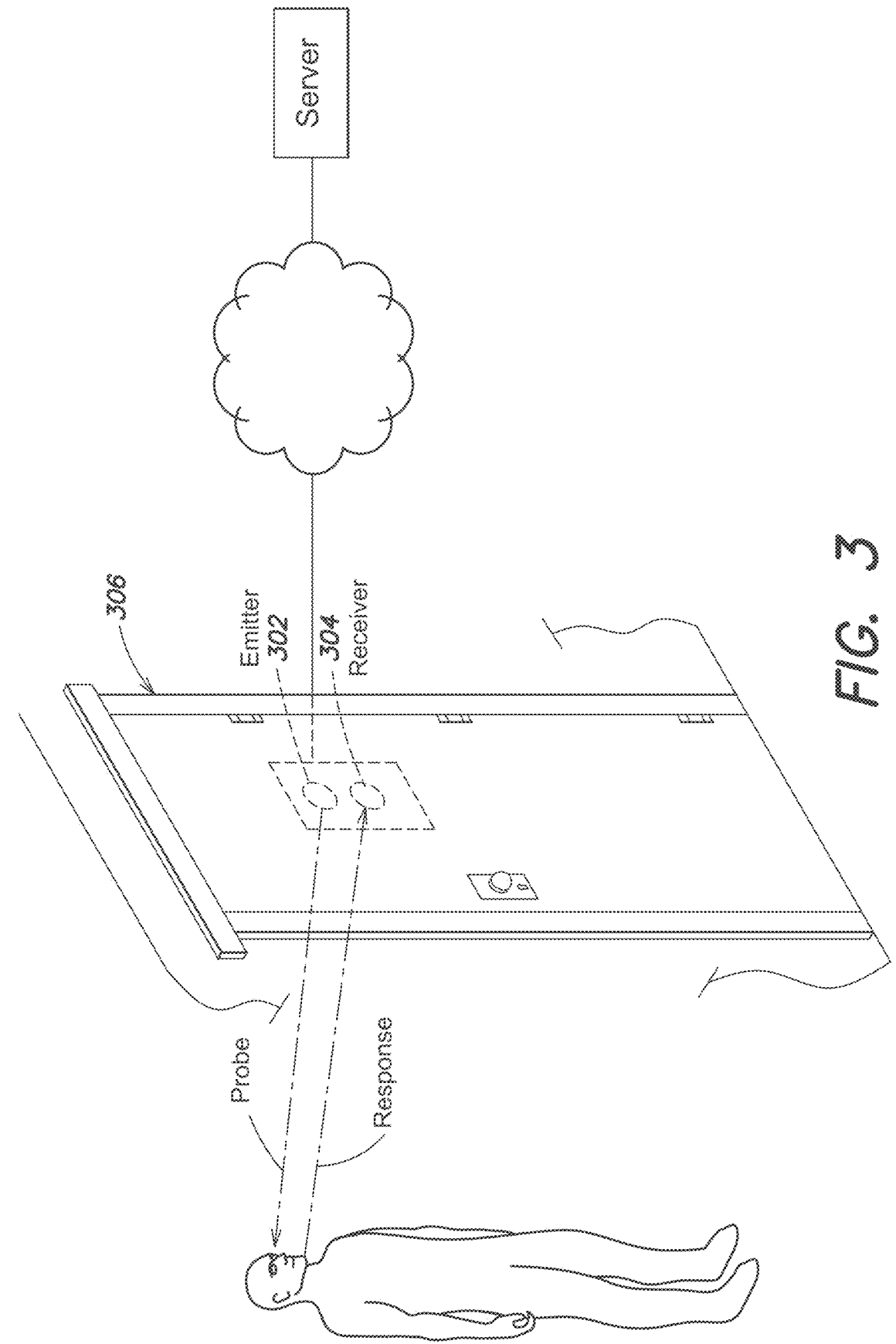
FIG. 3 is a diagram illustrating an embodiment of the described access control methods.

When the biometric authentication methods are used for controlling physical access of unsupervised individuals to premises or enclosed volumes, the implementation involves the placement of an emitter and a receiver at the point of access. A high level diagrammatic illustration of such an implementation is shown in FIG. 3, in which emitter 302 and receiver 304 are embedded or otherwise attached to physical point of access 306. Such a point of access may be a door, door frame, or other means of controlling physical access.

Probes of electromagnetic radiation may be in the infra-red part of the spectrum, which is invisible to the human eye, harmless at low levels of intensity and has a low cost of generation and of detection. Other parts of the electromagnetic spectrum may also be deployed, including the terahertz wavebands which have the ability to penetrate external coverings. The probes may also be in the ultra-violet, x-ray or gamma ray parts of the electromagnetic spectrum. Acoustic waves, including ultrasound, may be used.

Other probes involve the use of subatomic particle beams, such as neutron or electron beams. The detected response from the human body part may include fluorescence and scintillation. The duration and intensity of particle beams directed at a human body part is principally limited by health risk considerations.

In addition to health and safety, considerations affecting the choice of the different types of probe used in human body part authentication and genuineness testing include the physical size and weight of the emitter and the receiver, the amount of power and energy required to undertake the test, the range over which the energy can usefully be propagated and detected, and the reliability of the results when a diversity of humans, including those of different genetic makeup, are tested under a range of conditions.

If a test is conducted in the same way on every occasion, an attacker is able to analyze the test method, analyze the results obtained from testing a person, infer what a success-ful test result looks like, steal or synthesize such a result, and inject it into an appropriate part of the capturing device to simulate a successfully passed test when the subject is not present. For this reason, it is necessary to change the test each time it is conducted, and to do so in a way that cannot easily be predicted by an attacker. Methods for temporal modulation of illumination during authentication are described in U.S. Pat. No. 9,075,975, which is wholly incorporated herein by reference. One method of achieving variability in the test uses ambient illumination as a probe, but this relies upon the ambient illumination changing unpredictably between each authentication. In another method, the test is changed to alter the wavelength of the probe on each test. In a further method, the test is changed to alter the spatial direction or distribution of the probe on each test. Any combination of these dynamic elements may be exploited. As used herein, a particular modulation imposed on a probe is referred to as a modulation pattern. Consistency of a modulation of a body part's response to a probe with a pattern used to modulate the probe refers to a degree of similarity between the response and the pattern. The degree of similarity may be determined in a single modality, such as temporal, spatial, or frequency, or it may be a multi-modal, with the consistency evaluation based on a combination of the degree of similarity measured in one or more different modalities. Temporal consistency may be determined by cross-correlation methods, or, for periodic modulations, with comparisons performed in frequency space. Various statistical, analytical, or machine learning techniques well known in the field of signal processing may be used in the consistency determination.

The characteristic response of a human body part to an incident probe may be analyzed either as a bulk phenom-enon, providing a single result representing the response of the entire part to the probe, or alternatively it may be analyzed as a spatial phenomenon, in which the results for small component areas of the part are separately measured. A spatial analysis will provide far more information about the part but will require a sensor whose resolution is sufficient to detect and measure the result from small areas. The ability to do this depends on the wavelength of the probe. If the probe has wavelengths greater than the order of centimeters (such as ultrasound of frequency below 33 kHz) the resolution obtainable is too low to spatially image a human body part. To enhance the angular resolution, a composite detector comprising a phased array of individual detectors separated by a distance corresponding to multiple wavelengths of the probe may be deployed. This may be achieved by distributing detectors across the face or around the sides of the personal device, or by using reflections from the local environment, and combining the signals by phased array or other signal processing techniques. This increases the maximum wavelength of the energy that can be used. Constraints on detectors also place an upper limit on the wavelength of radiation that may be used. For example, if imaging at VGA resolution (640×480) is required from a single detector suitable for mounting on a personal device, the detector pixel size must necessarily be smaller than 3 microns wide, and hence unsuitable for detecting radiation with a wavelength longer than about 1 micron.

A bulk analysis may be used to provide an overall assessment of the response characteristics of the body part and may therefore be useful. A bulk analysis provides a spatially integrated average of the response characteristic of the body part. This may show features that are characteristic of such a body part and likely to differentiate it from a copy. If there is sufficient complexity in the bulk response that it is not readily predictable from prior knowledge of the stimulus, it can be used as part of a fake detection system. For example, the palm of a human hand shows a bulk absorption spectrum in the near infra-red that is character-istic of human skin and subcutaneous tissue, and whose spectral regions of absorption may vary from person to person. Recreating such a response spectrum may be diffi-cult to forge authentically.

A spatially resolved analysis of the response characteris-tics of the body part provides much more information than a bulk analysis about the genuineness of the body part. The spectral, reflection, and fluorescence characteristics of the body part may vary spatially in a complex and characteristic way that is harder for a forger to replicate convincingly. It may also serve to identify any limited parts of the body part that have been adulterated, such as areas of a face that have masking material on them.

Further information about the body part may be obtained by measuring the temporal response of the part following absorption of a pulse of energy from the probe. If the probe causes phosphorescence, then there is a natural decay time following the start of the excitation which may be detected and measured, either once the excitation and immediate response has ceased, or by deconvolving the delayed response from the immediate response during the excitation period, or both.

Figure 4:
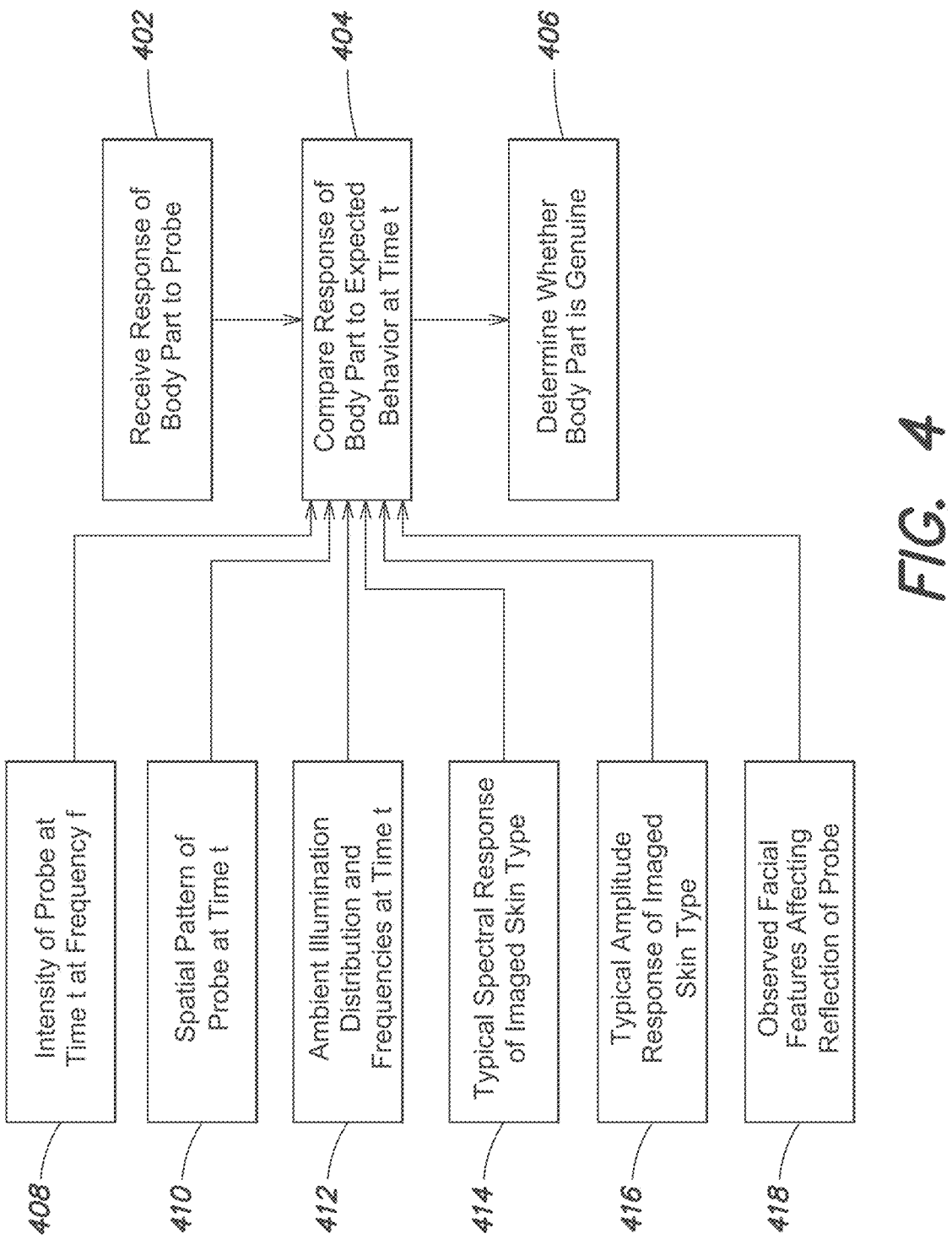
FIG. 4 is a high-level block diagram showing data that may be input and used during body part genuineness testing.

The response of the body part to the probe illumination is analyzed while taking into account the known properties of the emitted probe, as well as properties of the genuine body part surface. FIG. 4 illustrates some of these factors, some of which are described further below. Referring to the figure, the response of the body part to the probe is received by a sensor (402) and then compared to the expected behavior of the response at a particular time t (404). The results of this comparison, i.e., the variance of the actual response of the body part from the expected response, is a measure of the quality of match between them and this is in turn compared to a threshold variance. The body part is deemed genuine if the quality of match is equal to or better than the threshold quality of match. As used herein, the quality of match is a measure of the similarity between an expected response and an actual body part response. This may be determined by such methods as cross-correlation, the presence or absence of key features in the response, such as the presence or absence of one or more spectral peaks or troughs, or implicit measures of similarity determined by the application of machine learning algorithms. As used herein the threshold quality of match used to distinguish the degrees of variance between an expected response and an actual response that fail and authentication test from those that pass the test is determined by experimentation on a corpus of test data and may be optimized by the use of machine learning algorithms. The threshold may be adjusted in accordance with the degree of security required for a particular application of the described authentication methods. Comparison step 404 receives as input one or more of the following: the intensity of the probe at time t and frequency f (408); the spatial pattern of the probe at time t (410), the ambient illumination distribution and frequencies at time t (412); the typical spectral response of the imaged skin type (414); the typical amplitude response of the imaged skin type (416); and the observed facial features affecting reflection of the probe (418).

The response of the body part to the probe illumination (whether ambient or controlled) may be assessed for genuineness by testing it against the class of responses considered typical of a human person. The classification may be undertaken by a machine learning method, such as those deploying a neural network. The class of responses include spectral characteristics of the human population represented by the class. As used herein, spectral characteristics include such properties as broadband spectral profiles, peaks and absorption bands in the spectrum, and other features in a spectrum which serve to characterize a frequency spectrum. This testing may take into account measured spectral characteristics of the individual under test, which are known to influence the typical response of such individuals. For example, the skin of dark-skinned persons absorbs more light in the red and near infra-red regions of the electromagnetic spectrum than does the skin of light-skinned persons. The skin tone of a person may be measured photographically and then used to influence the analysis of the skin response to other incident energy types. The classification may take into account information gathered about the subject at the time of testing to compensate for the effect of various factors on the actual response. Such factors include the ambient light intensity, amount of sweat visible on their skin, the presence of facial hair or glasses, and the subject's pose. The subject's pose may be determined by methods such as point-fitting, and the result used to assist in the determination of the likelihood that the reflection pattern from the body part is genuine. For example, plastic spectacle lenses are substantially opaque to infra-red light, and hence the visible presence of glasses on a subject would cause the use of tests that respond positively (i.e., in favor of the subject being genuine) if the infra-red reflection amplitude from an area corresponding to the visible area of the lens or frame is very low or absent. Similarly, the characteristics of facial hair of different length and consistency may be analyzed in the visible image, and its expected effect on specular reflection characteristics used in the testing. The ambient light intensity may be measured and used to make inferences about the intensity of the reflections arising from the probe illumination.

A special limiting case of such classification is to compare the response against the narrow class of responses expected from the specific individual seeking authentication. In this case the response is compared to that recorded during an initial enrollment by the individual, so the test is equivalent to treating it as a biometric characteristic of the person. Thus, an individual spatial spectral response of a person may be a biometric, which is used for constructing a template and matching the response against it. The comparison of the actual response may be against one single reference template, or against a number of templates, or against a model constructed from the information about the person gained from successful previous reference template matching and genuineness tests. Because of its narrow specificity to the individual, this is not a test for genuineness, but a biometric template matching test based on a large and non-public set of features.

The response of the body part to excitation by a range of wavelengths may be tested in one or more of the following ways. First, the illumination is created by probes emitting at well-defined frequencies and the detection is accomplished by a broadband, non-selective detector. Second, the illumination is created by probes that emit a wide range of frequencies across the range of interest, and the detector provides a precise discrimination of the response in each of a plurality of frequency bands. Third, the probe emitter radiates energy at precisely defined frequencies and the detector detects and discriminates between responses at precise frequencies, which include those emitted by the probe. Fourth, the probe emitter radiates energy at one or more precisely defined central frequencies with sidebands, and the combination of the central frequencies and the sidebands are detectable by two or more sensors tuned to different frequencies. This is analogous to the way that three-sensor or three-filter digital color photography is implemented in the visible band.

While all four of these methods provide information about the response of the body part to the incident probe, which may be used for genuineness testing, the third and fourth methods provide the greatest scope for combating replay attacks. In these cases, the probe is modulated so as to illuminate the subject by a time sequence or spatial pattern of different frequencies with the same or different amplitudes or a combination of both the same and different amplitudes. This amplitude refers to one or both of the mean value of the incident probe intensity and the amplitude of the modulation itself. This modulation sequence is different from those used in previous or future tests and is determined by algorithms that result in sequences that are difficult to predict. The detector is capable of detecting each of these frequencies and their amplitudes, enabling determination that the particular frequency and amplitude has been used by the probe, and providing information on the response of the body part to that frequency. The information about what sequence has been used to test the subject in this case is a secret known only to the tester up to the time of testing, and hence is not available to an attacker until that time. If the sequence and/or spatial pattern has sufficient variety in its possible values and the response is sufficiently complex, then it will be infeasible for an attacker to synthesize a convincing forgery of the response in the brief time available between the disclosure of the sequence and the capture of the response.

By contrast, if a frequency-controlled emitter and a broadband receiver are used, the variety and complexity of the response from the sensor is greatly reduced since, in general, the sensor is not able to determine the frequencies used by the emitter. Therefore, this method does not offer the highest level of security.

If a broadband emitter and a frequency-sensitive receiver are used, the variety and complexity of the response from the sensor is also reduced because of the reduced spectral variety of the signal used to radiate the subject. The variety may be supplemented by including spatial variability in the probe, i.e., by changing the spatial illumination pattern projected onto the body part each time a test is undertaken. In such a case the spectral response of the subject across a range of frequencies is obtained, and recordings are distinguished by the different spatial patterns of illumination used on each occasion.

One approach to assessing the desired complexity is to require that the same sequence or pattern should not recur in a person's lifetime. If the person authenticates 10 times per day for the 30,000 days of an active life, a code space of 300,000 separate codes is required. Postulating an efficiency of 10% to account for codes that are not usable due to the lack of variety between bits, and the need for synchronization cues in the code increases the required code space to 3,000,000 codes. This may be obtained by the combination of an alphabet of illumination options and the number of such symbols used per test.

The use of illumination by a probe which is not visible to the human eye has significant advantages. The first concerns limits to the modulation speed. The rate at which twelve different visible illumination colors can be presented to a person is limited by the need to protect the person from the possible stimulation of photosensitive epilepsy. International standards for the protection from photosensitive epilepsy prohibit the presentation of visible illumination sources changing faster than six different colors per second. This limits the speed at which tests can be conducted in the visible spectrum. No such limit applies to a non-visible probe.

A second advantage of using a probe not visible to the human eye involves probe intensity. In the visible or audible spectrum, probe intensity is limited by considerations of user comfort since bright lights or loud sounds are uncomfortable for the user and may be socially unacceptable. No such limitation applies to illumination by non-perceptible energy, which can be made as intense as is permitted by safety considerations and by the amount of space and power available in the device.

Further information about the genuineness of the subject can be gained by measuring the time of flight of the probe between the emitter, the subject and the sensor. Variations in the time of flight of reflections between different points on the subject's body part provide an accurate measurement of the relative distance of each such point from the testing device and hence of the depth profile of the part. This enables the three-dimensional form of the body part to be determined. Comparing the form to the class of forms expected from that class of body part provides a test for genuineness. Comparing the measured form to a previously enrolled form determined for that individual provides another type of biometric.

For short wavelength probes, time of flight may be measured by emitting a short pulse of illumination lasting less than the propagation time of the probe to the subject and back. Depth information is determined by measuring the time delay from the start of the pulse to the start of reception. For longer wavelengths, illumination may be continuous, and the phase of the reflected wave is compared to the illuminating signal for points across the extent of the body part. Standard interferometry techniques then provide information about the time of flight to each such point.

This test of depth by time of flight is compatible with the tests for the spectral absorption of the illuminating probe. Protection from replay attack also requires that an aspect of the test is varied on each test. Such variability may be achieved by changing the frequency at which the time of flight is measured several times during the test in an unpredictable manner. Other methods of introducing variability include changing the frequency at which time of flight is measured between each test and changing the points on the body part whose depth is tested on each test occasion, so that the same pattern or sequence of body part points is not depth tested on subsequent occasions.

The responses to the test may be reviewed, analyzed and independently tested on a remote server, on the device itself, or on a combination of both. When transmitting information for processing on a server, the security of the system security may be enhanced by transmitting information about the test in as unprocessed a form as possible. This defends against tampering with the testing device, and the remote observation of attempts to experiment with the testing system to find its weaknesses. The data sent to the server contains as little information as possible on the methods used to assess genuineness. For example, the information transmitted for a given test may be limited to multi-spectral images of the illuminated body part, and raw information about time of flight to multiple points on the body part.

Some or all of the processing may take place on the device to which the sensors are directly attached, such as a mobile device. This may be preferable if the system is used to authenticate locally for reasons of speed, or to assist a user locally, for example to unlock their device or authenticate when offline. The security of the system is improved if some or all of the security sensitive processing takes place within a Trusted Execution Environment, a hardware space into which it is hard for an intruder to enter and view, analyze, or tamper with execution software.

The user device may contain an infra-red emitter capable of flood-illuminating the body part at two, three, or more different frequencies. In various embodiments, the device also includes a sensor that may be used to detect the response of the body part to the probe. The device sensor may include a low-cost infra-red camera similar to a low-cost smartphone camera, containing CMOS sensors, each sensitive to a different one of the two, three, or more frequencies of the infra-red emitters. Such sensitivity may be accomplished by tuning the photon sensitivity of the sensor pixels, or by applying narrow-band filters to broadband sensor pixels. A Bayer pattern filter is one means of applying such filters. Filters placed over the whole sensor is another means of applying such filters. The filters may use dichroic technology or dye technology. The infra-red emitters are instructed to emit radiation according to a code with many transitions in it, with a different code controlling the emitter of each frequency. In various embodiments, the emitters respond to each successive bit in the code every 15-20 milliseconds and illuminate the user with 10-14 successive frequency combinations in 200 milliseconds.

The choice of the illuminating radiation wavelengths is guided principally by two factors: the intensity of the ambient illumination, which determines the amount of illumination power necessary to achieve an adequate signal-to-noise ratio; and the variations in the response of the body part at the different frequencies, which must be sufficiently large to provide a clear signature of the genuine article. In certain embodiments, the detection of these differences is used as an indicator that genuine human flesh is being illuminated by the probe.

For example, the absorption of human skin and tissue varies markedly between different frequencies in the near infra-red spectrum. In the near-visible infra-red, the ambient illumination power from the sun outdoors in North America is of the order of 0.7 W/m2/nm at a wavelength of 1000 nm. At several wavelengths, the ambient illumination is substantially reduced as a result of absorption by substances in the atmosphere. These include oxygen, which absorbs strongly at 760 nm, and water absorption bands at around 850 nm, 940 nm, 1140 nm, and 1380 nm. Both carbon dioxide and water vapor absorb strongly in a wide band around 2700 nm. For a sensor sensitive to low-level signals in these bands, the required illumination levels in these bands is less than would be required at other frequencies to achieve a level of illumination sufficient to provide an adequate signal-to-noise ratio even if signals from adjoining bands are stronger. In various embodiments the marked differences in the response of human skin between these frequency bands is used to detect the absorption signature of a genuine body part.

In various embodiments, the body part is simultaneously illuminated by a broadband emitter and also by a number of specific frequencies that change rapidly in time. The broadband sensor captures the sum of the response of the body part to the static broad-spectrum illumination and to the changing narrow-band illumination. This reveals the response of the body part to all parts of the illuminating spectrum simultaneously, and also stamps the captured imagery with a one-time code, which distinguishes it from a replay of recorded imagery.

If space or power constraints make it infeasible to flood the body part with illumination of an intensity that exceeds the ambient illumination by a sufficient margin, the signal to noise ratio may be increased by modulating the imposed illumination and filtering the received image with a matched filter. For example, if the illumination is modulated at 1 KHz, the incoming image is filtered so as to remove all signal not modulated at 1 KHz, thereby preferentially attenuating the ambient illumination and enhancing the signal to noise ratio of the reflected signals. Another signal enhancement method involves switching the physical location at which the directed illumination is incident on the body part, and spatially filtering the received signal in synchrony with this spatial modulation.

A combination of the described methods may be used to simultaneously increase the signal to noise ratio of the received response to the probe and to impede an attacker's ability to create a forgery by modulating the imposed illumination and/or changing its spatial distribution under the control of a complex code of random or pseudo-random nature which is difficult to predict. This code is then used in the analysis of the received information to control the matching filter and thereby enhance the signal-to-noise ratio of the detected illumination.

The test for genuineness may be enhanced by altering or augmenting the response of the body part by introducing one or more artificial elements onto or into the skin which respond to the probe in pre-determined ways. Examples of such elements include chemicals applied onto the skin by such methods as painting, cosmetic application, and applying patches. An artificial element may be inserted under the skin using methods such as injection and tattooing. The penetration of incident near-infrared probe energy and of a response from the buried element is sufficient to permit artificial elements to serve the present purpose up to depths of 4-6 mm. In some embodiments, an artificial element may comprise one or more microchips attached to the body with applied patches and/or inserted within or beneath the skin.

Artificial elements respond to the incoming probe energy excitation in a waveband to which the sensors are sensitive. An artificial element may include a microencapsulated fluorescent material which produces an instantaneous response to the probe at a different wavelength from that of the probe. In certain embodiments, materials exhibiting persistent luminescence that produce a response over time are used in the artificial element. Examples of long-persistence near-infrared materials include doped zinc gallium oxides and polynuclear chrome (III)-lanthanide (III) complexes. The response may be determined in a time-invariant manner by the frequency or the intensity of the incoming probe excitation. For some probes, the response is determined by the time sequence of frequencies or intensities of the incoming probe excitation. For example, the temporal response of the element emissions may have a complex relationship to the time sequence of the incoming probe excitations. This relationship may be represented by a mathematical function, which may be stochastic and modeled by a Markov chain. The mathematical function may be the same for all the elements applied to all users, or different when applied to each user. The mathematical function may be a cryptographic function, such as a linear feedback shift register with a long period, whose underlying nature is difficult to infer using classical computing methods based on a large number of observations of pairs of probe excitation sequences and element responses. The mathematical function may be partly determined by a secret key, which may be the same for all users, or may vary, such that: (i) different keys may be used for elements applied to different parts of the body; (ii) different keys may be used for persons belonging to distinct groups; and (iii) a different key may be used for each individual. A zero-knowledge proof algorithm may be implemented in determining the responses of the elements.

The artificial element may be a chemical with several excitation levels in its atomic or molecular structure and several time constants for relaxation, so that the radiation emitted during relaxation is a function of the time sequence of excitation. Heptamethine cyanine dyes are an example of such chemicals. The element may include a mixture of several chemicals, the relaxation emission from one of which serves as excitation for another, and a chain of such couplings may be implemented. Separate chemicals may be applied to or under the skin in close proximity to each other, instead of being mixed. For probe radiation in the infra-red or other non-visible spectrum, the chemicals may be colorless or of a neutral in the visible spectrum, so as to minimize aesthetic impact on the appearance of the individual.

Microchips that constitute or form part of an artificial element may include one or more photo-sensitive detectors capable of receiving the incoming probe radiation and translating them into electrical signals. These electrical signals may be received by a processing structure which computes a sequence of responses, using information previously stored on, programmed into, or transmitted to the microchip. The sequence of responses is passed to an emitting structure, which emits radiation at a frequency within the band of detection of the receiving system. The emitting structure may be on the skin surface or may be buried under the skin as part of or separately from the microchip that determines the response to the incident probe. The processing structure may include a linear-feedback shift register, or a means to encode the incoming sequence using an asymmetrical cryptographic function, such as a public key system (e.g., RSA), a signature scheme, (e.g., BLS), the Digital Signature Algorithm (DSA), or a zero-knowledge proof. In various embodiments, the energy to power the chip and optionally the processing structure and the emitter comes solely from the incoming probe radiation or is supplied to the chip through radiation contemporaneous with but separate from the incoming probe radiation or has been accumulated from exposure to ambient radiation over time.

The spatial arrangement of the elements on the body part may be the same for all individuals—for example always placed on the tip of the nose. They may be sited in arbitrary places, without spatial significance from the point of view of the authentication method deployed, thus giving the user freedom to place the elements where they choose. Alternatively, they may be sited in a spatial arrangement that is unique to the individual, thus providing the user with an additional credential.

When the individual is illuminated by a sequence of probe radiation, the response of one or more artificial elements to the sequence is evaluated for genuineness. An attacker with access to the imagery of the user generated by illuminating the user with the probe during prior authentication sessions may be able to determine the spatial position of the elements. When artificial elements have no memory and respond in a deterministic manner to the frequency and/or intensity of each incoming probe radiation, an attacker with access to enough data on prior authentication attempts may succeed in determining the behavior of the artificial elements. The amount of data required represents a security hurdle sufficient to permit the use of this method to provide some level of security. However, when the response of the elements is a function of the overall sequence, as in the multi-excitation level case described above, the amount of past data required by an attacker to infer the response of the elements from previous behavior and to predict their response to a new sequence of excitation represents a qualitatively tougher challenge.

A secret key comprises information that determines the response of artificial elements to the illuminating probe radiation. The key may be encoded in one or more of the spatial, temporal, and spectral responses of the elements to the probe. If the secret key to the response is the same for all users, then provided that the key remains secret the response of the elements will provide a secure test of genuineness of the body part. However, if the key is compromised, the integrity of the entire system will be compromised for all users. This will be the case even if the method of checking the correctness of the element response does not require access to the secret key. This risk is mitigated by issuing different keys to each user and/or by changing the keys on a regular basis. Artificial elements that degrade over time or are ejected from the user's body require regular renewal, which may in any case mandate changing the key.

The use of artificial elements that respond in a way that is unique to the individual may be of particular value when authenticating people whose skin is largely or wholly covered. This situation arises in certain environments where protective clothing is worn against extreme weather conditions, or in hostile or dangerous situations in an industrial or military context. Clothing may also cover individuals adhering to certain religious or cultural norms, when some or all of the individual's head may be covered.

Blood flow through veins, arteries, and capillaries under the skin can be perceived in the infra-red due to the thermal emission of blood which is warmer than the surrounding tissue. This enables thermal infrared imagery of a user's blood flow to be captured as a static or dynamic biometric credential. The flow of blood may alternatively be imaged by detecting the differential absorption or reflection of ambient or probe-generated electromagnetic energy impinging on the skin. The probe energy may include frequencies which are absorbed or reflected sufficiently strongly by blood to make blood pressure changes visible with good signal-to-noise ratio at a distance. As the heart beats, the subcutaneous capillaries fill with oxygenated blood in response to pressure exerted by the heart muscle. The detailed profile of the change in blood pressure over the course of each beat is a function of the heart muscle profile of the individual, together with characteristics of their circulatory system, and can be used as a method of identification, authentication, verification or proof of genuineness of the individual. Machine learning systems may be deployed to discriminate differences in this profile between individuals or between real humans and facsimiles.

Illumination of the subject may be accomplished by probes originating from multiple spatially separated sources, or by multiple probes emitted from the same source with each probe having a distinct frequency or temporal variation. Genuineness is checked by ensuring that the reflected spatial pattern, spectral response and/or temporal response is consistent with the illumination from the different emitters. A fixed installation may consist of two or more physically separated sources that may be modulated by the same control signal or by different control signals that are independent of each other. In some embodiments the subject is illuminated both by one or more physically static sources and simultaneously by one or more sources belonging to their mobile device. Either or both sources may be modulated in time and/or frequency. The test for genuineness involves ensuring that the response of the subject to these illuminations is consistent with both illuminations being present. Compromise of one of the sources of illumination, e.g., of a user's device, is insufficient to enable an attacker to replicate the entire illumination pattern and create a convincing facsimile. Such an arrangement also serves to verify a physical location of a user in a manner which cannot be subverted by compromise of their personal device. In some embodiments, a fixed source of illumination includes modulated invisible radiation that forms part of the output of low-power lightbulbs. Such modulation patterns are built-in characteristics of the location, manufacturer, time and date of manufacture, or control signals supplied to the lightbulb or other source of illumination, which provide a kind of forensic signature of the bulb. The modulation patterns may in addition or alternatively be deliberately superposed onto spatial flood or spot illuminators to generate a unique illumination signature for a physical space. Such location-based illuminators may be modulated by control signals that are generated locally or remotely.

Figure 5:
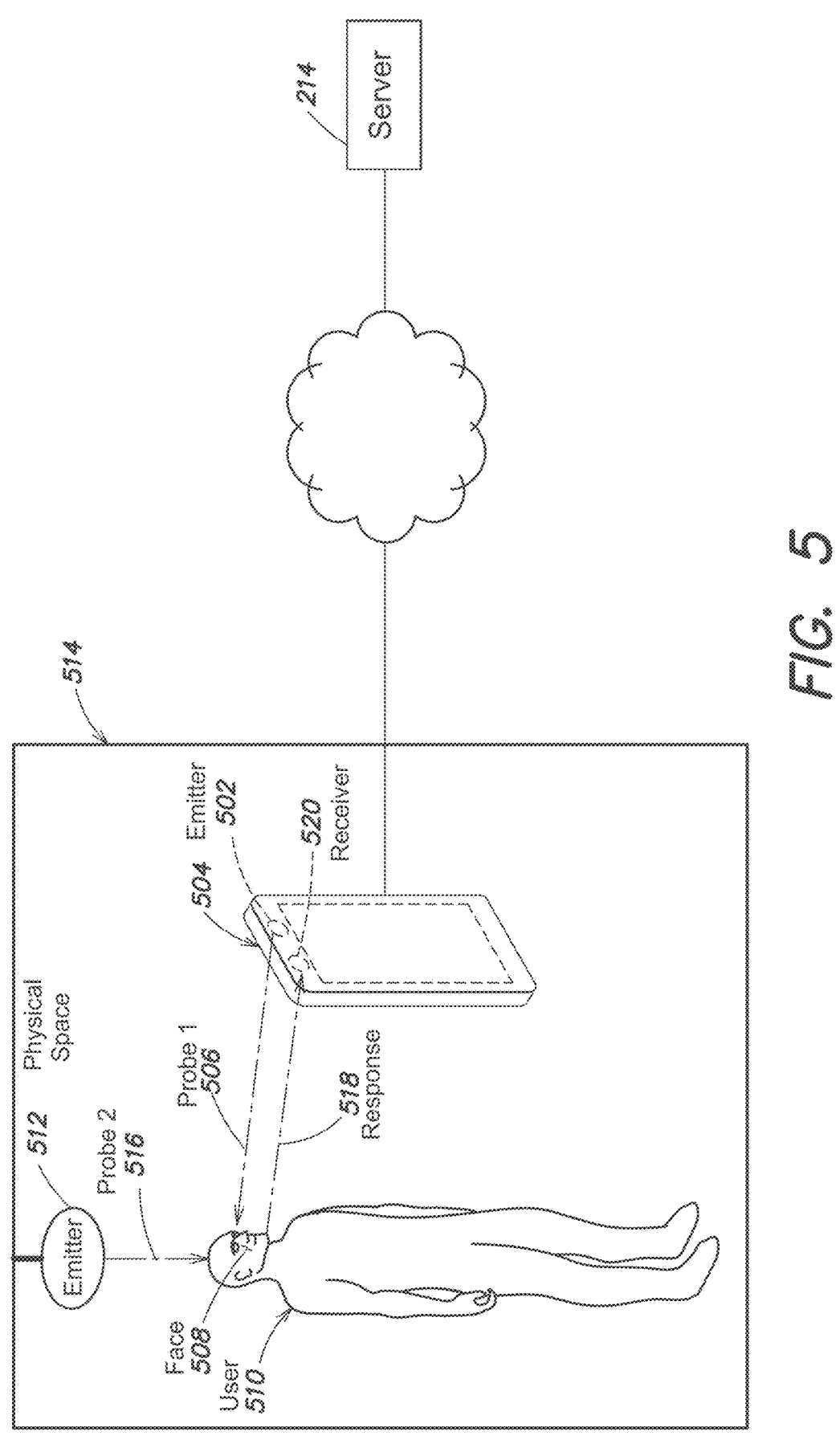
FIG. 5 is a diagram illustrating the described authentication methods with two probes, one originating from the user device and the other being physically associated with a physical space in which the user is located when authentication is being performed.

FIG. 5 illustrates an embodiment with two probes, one originating from the user device and the other being physically associated with the physical space in which the user is located when genuine testing is being performed. Emitter 502 in user device 504 results in probe 1 506 directed towards body part 508 of user 510. Location-based emitter 512 is present within physical space 514 where the user is located and generates probe 2 516 that also illuminates user body part 508. Response 518 from the user body part includes components evoked by both probe 1 and by probe 2 and is received by receiver 520. The received response is processed and analyzed by one or both of digital processors (not shown) local to the physical access point and in remote server 522.

Figure 6:
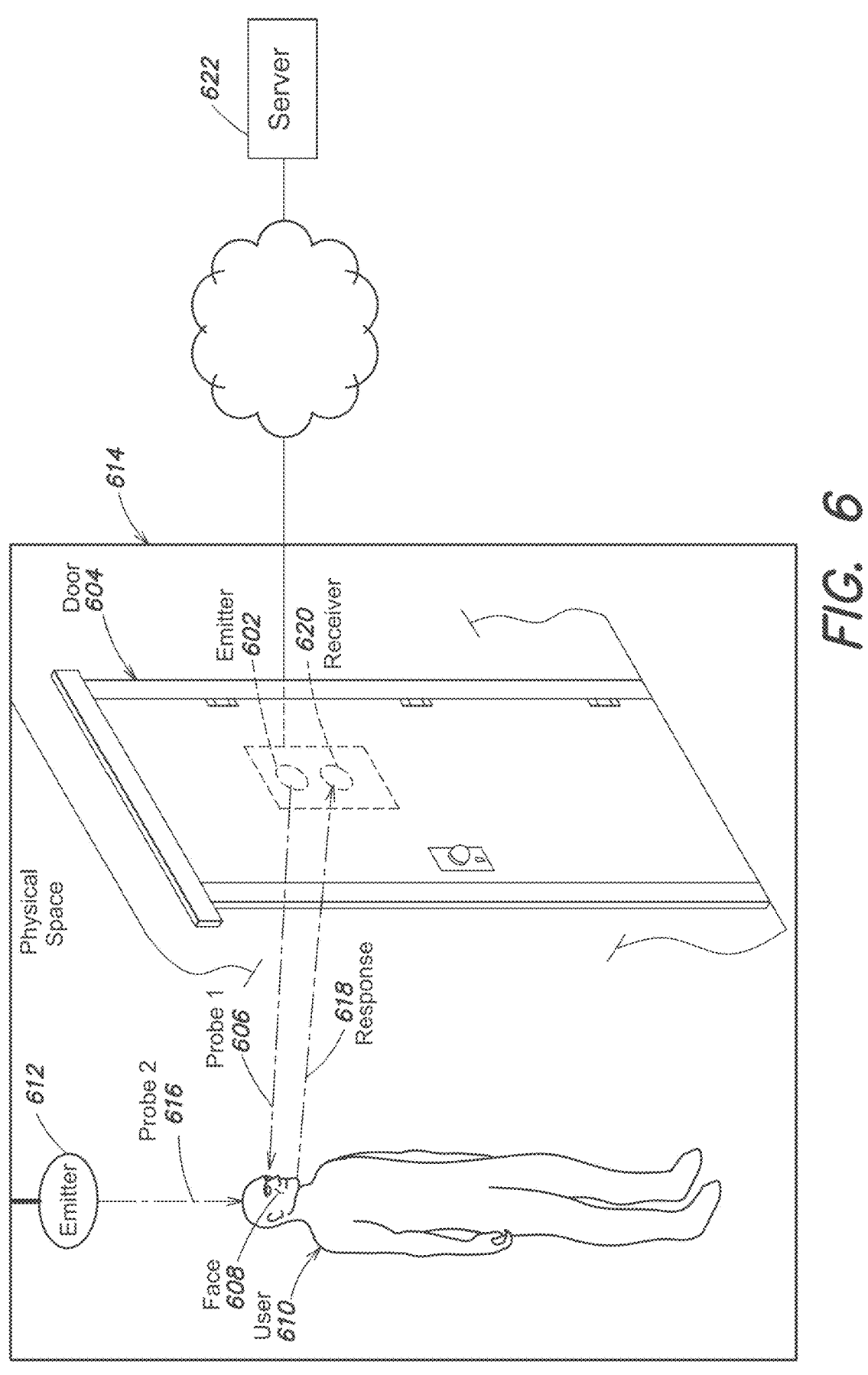
FIG. 6 is a diagram illustrating the described authentication methods for access to a physical space involving a probe embedded in the physical access point as well as another probe that illuminates the physical space surrounding the user seeking to gain access.

FIG. 6 illustrates authentication testing for access to a physical space involving a probe embedded in affixed to the physical access point as well as another probe that illuminates the physical space surrounding the user seeking to gain access. Emitter 602 in physical access point 604 generates probe 1 606 that is directed to body part 608 of user 610. Location-based emitter 612 in physical space 614 generates probe 2 616 that illuminates the space, including user body part 608. Response 618 of the user body part to both probes is received by receiver 620, and is processed and analyzed by one or both of digital processors (not shown) local to the physical access point and in remote server 622.

The interaction between the two sources of illumination may be complex, with response non-linearities in the sensor systems causing convolution of the separate responses to each probe. Significant complexity is also present in reflection patterns generated by the illuminated body part. These responses may be analyzed by the system for genuineness detection using analytical techniques based on models of the illumination and subject systems, or by machine learning systems trained to distinguish between genuine and non-genuine responses.

In some embodiments, a location such as an office is illuminated with infra-red radiation which is modulated in intensity and/or frequency. This modulation is intended to be location-specific. Cryptographic techniques applied to the generation of the modulation prevent the temporal sequence to be readily inferred, even from a prolonged period of observation. Illumination in the near infra-red, such as at 850 nm or 940 nm, is invisible to the persons illuminated, but is detectable by standard camera equipment installed in personal devices such as smartphones. Users authenticating using the standard hardware on their personal devices thus produce imagery affected by the location-specific modulated illumination sources. This provides a test for the genuine presence of the user in the location subject to the illumination, without the user being aware or having to undertake any specific action.

The various methods for biometric authentication described herein are applicable, but limited to the following body parts: face, car, eyelid, iris, retina, palm, hand viewed as a silhouette, fingerprints, elbow, and foot. Skin melanin patterns may also be used with the described techniques. Certain body parts, such as the face, lend themselves to implementations based on the use of an individual's mobile device, while other body parts, such as the ear, are well-suited to authenticating when seeking access to a physical space, for example when unlocking a door.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or non-volatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

What is claimed is:

1. A method of authenticating a genuine presence of a user, the method comprising:

generating an electromagnetic probe;

modulating the electromagnetic probe according to a pattern, wherein the pattern is not duplicated when performing a succeeding authentication of the user using the electromagnetic probe;

generating an ultrasonic probe;

directing the modulated electromagnetic probe and the ultrasonic probe towards a body part of the user;

receiving responses of the body part to the modulated electromagnetic probe and the ultrasonic probe;

sending data representing the responses of the body part to a digital data processor; and at a digital data processor, analyzing the data representing the responses of the body part and authenticating the user if the analysis indicates that:

the data representing the response to the electromagnetic probe includes a modulation consistent with the pattern used to modulate the electromagnetic probe and a spatial distribution consistent with reflection from the body part; and the data representing the response from the ultrasound probe is temporally consistent with a reflection from the body part.

2. The method of claim 1, wherein the ultrasonic probe is modulated and the data representing the response from the ultrasound probe is consistent with the modulation of the ultrasonic probe.

3. The method of claim 1, wherein video imagery of the body part is captured and the data representing the response from the ultrasound probe is temporally consistent with changes in the captured video imagery of the body part.

4. The method of claim 1, wherein imagery of the body part is captured and the data representing the response from the ultrasound probe is spatially consistent with features in the captured imagery of the body part.

5. A mobile device comprising:

a CPU; and a non-transitory memory storing instructions for execution by the CPU, wherein execution of the instructions on the CPU implements a method of authenticating a genuine presence of a user, the method comprising:

generating an electromagnetic probe;

modulating the electromagnetic probe according to a pattern, wherein the pattern is not duplicated when performing a succeeding authentication of the user using the electromagnetic probe;

generating an ultrasonic probe;

directing the modulated electromagnetic probe and the ultrasonic probe towards a body part of the user;

receiving responses of the body part to the modulated electromagnetic probe and the ultrasonic probe;

sending data representing the responses of the body part to a digital data processor; and at a digital data processor, analyzing the data representing the responses of the body part and authenticating the user if the analysis indicates that:

the data representing the response to the electromagnetic probe includes a modulation consistent with the pattern used to modulate the electromagnetic probe and a spatial distribution consistent with reflection from the body part; and the data representing the response from the ultrasound probe is temporally consistent with a reflection from the body part.

6. The mobile device of claim 5, wherein the ultrasonic probe is modulated and the data representing the response from the ultrasound probe is consistent with the modulation of the ultrasonic probe.

7. The mobile device of claim 5, wherein video imagery of the body part is captured and the data representing the response from the ultrasound probe is temporally consistent with changes in the captured video imagery of the body part.

8. The mobile device of claim 5, wherein imagery of the body part is captured and the data representing the response from the ultrasound probe is spatially consistent with features in the captured imagery of the body part.

9. An application for a mobile device comprising:

instructions for execution on a CPU of a mobile device, the instructions being stored on a non-transitory computer-readable storage, wherein the instructions, when processed on the CPU of the mobile device, instruct the mobile device to perform a method of authenticating a genuine presence of a user, the method comprising:

generating an electromagnetic probe;

modulating the electromagnetic probe according to a pattern, wherein the pattern is not duplicated when performing a succeeding authentication of the user using the electromagnetic probe;

generating an ultrasonic probe;

directing the modulated electromagnetic probe and the ultrasonic probe towards a body part of the user;

receiving responses of the body part to the modulated electromagnetic probe and the ultrasonic probe;

sending data representing the responses of the body part to a digital data processor; and at a digital data processor, analyzing the data representing the responses of the body part and authenticating the user if the analysis indicates that:

the data representing the response to the electromagnetic probe includes a modulation consistent with the pattern used to modulate the electromagnetic probe and a spatial distribution consistent with reflection from the body part; and the data representing the response from the ultrasound probe is temporally consistent with a reflection from the body part.

10. The application for a mobile device of claim 9, wherein the ultrasonic probe is modulated and the data representing the response from the ultrasound probe is consistent with the modulation of the ultrasonic probe.

11. The application for a mobile device of claim 9, wherein video imagery of the body part is captured and the data representing the response from the ultrasound probe is temporally consistent with changes in the captured video imagery of the body part.

12. The application for a mobile device of claim 9, wherein imagery of the body part is captured and the data representing the response from the ultrasound probe is spatially consistent with features in the captured imagery of the body part.

* * * * *